Sept. 22, 1936. J. H. PULS 2,055,048
ENTRAINMENT SEPARATOR FOR FRACTIONATING TOWERS
Filed June 30, 1932
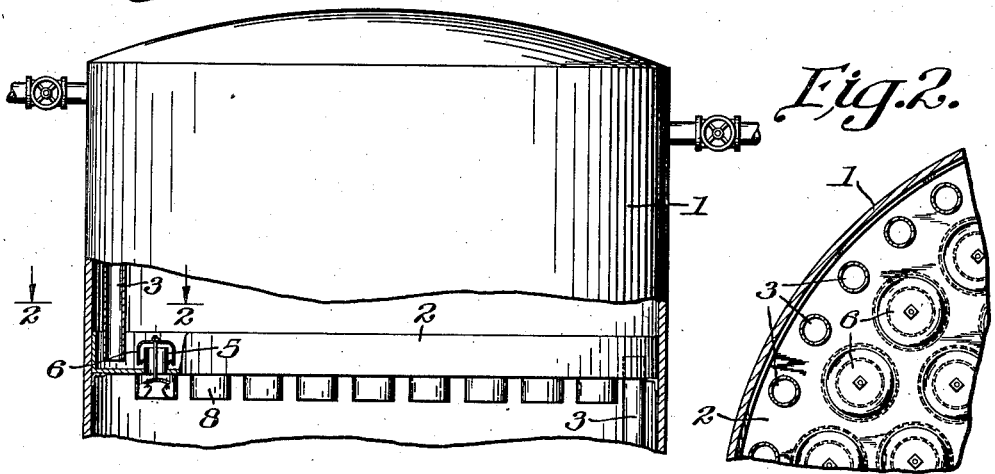
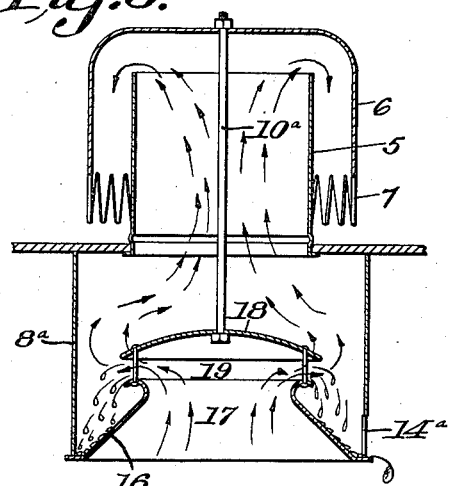
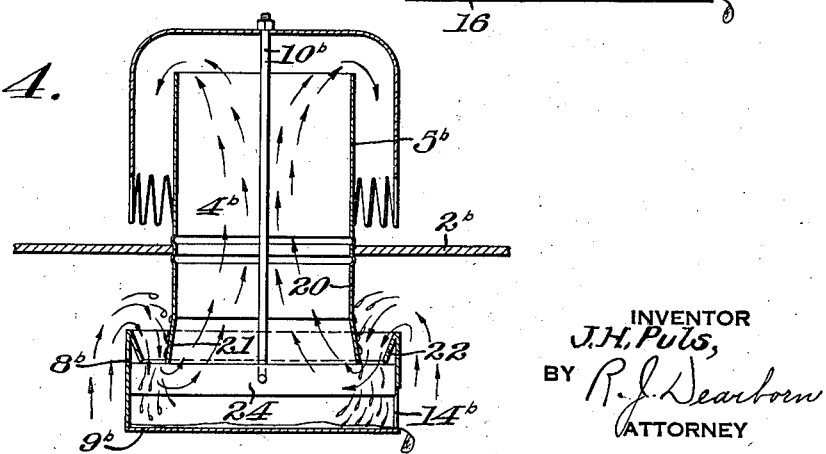
INVENTOR
J.H. Puls,
BY R. J. Dearborn
ATTORNEY Patented Sept. 22, 1936

2,055,048

UNITED STATES PATENT OFFICE 2,055,048

ENTRAINMENT SEPARATOR FOR FRACTIONATING TOWERS

John Harold Puls, Los Angeles, Calif., assignor to The Texas Company, New York, N. Y., a corporation of Delaware Application June 30, 1932, Serial No. 620,172

7 Claims. (Cl. 261—114)

This invention relates to improvements in fractionating apparatus in order to effect a sharper separation into desired fractions. The invention is concerned particularly with means for overcoming entrainment of liquid particles in rising vapor in the usual type of rectifying equipment, characterized by the provision of successive zones of liquid through which the rising vapors are caused to pass; such for example, as the usual tray and bubble cap type of fractionating towers.

In the petroleum industry it is necessary commercially to operate fractionating apparatus to very great capacity, necessitating the passage of vapors through the apparatus at high rates of flow. By so operating, the rapid course of the vapors has a strong tendency to entrain particles of liquid, carrying them from one tray to the liquid on the next higher tray in the column, thus partially defeating the very purpose of fractionation. The present invention, therefore, is intended to avoid the effect of entrainment and consists essentially in means for removing entrained particles of liquid from the vapors before they reach the next higher tray in the column.

The above and other objects will appear more fully from the following description, when considered in connection with the drawing, in which Fig. 1 is a fragmentary elevational view of a fractionating tower provided with my invention, parts being broken away;

Fig. 2 is a partial transverse sectional view on the line 2—2 of Fig. 1;

Fig. 3 is an enlarged vertical sectional view illustrating the liquid separator shown in Figs. 1 and 2;

Fig. 4 is a view similar to Fig. 3 showing a modification of the invention.

Referring to the details of the drawing, there is illustrated a usual type of fractionating tower or column 1 which may be provided with a vapor inlet in the lower end and a vapor outlet at the top of the column and with an inlet for cooling liquid, if preferred, in the upper portion of the tower. Such liquid outlets as are required may be provided. The column is provided with a number of transverse trays 2, formed to retain a limited quantity of liquid therein and suitably supported upon the wall of the tower casing. Liquid is permitted to pass downwardly from one tray to another through the usual overflow pipes 3, or otherwise.

The vapor passages are provided with thimbles or nipples 5 secured in the trays 2, the nipples being enclosed within the usual bubble caps 6, spaced from the nipples to provide vapor passages and preferably formed at the lower edges thereof with serrations 7. Each bubble cap is supported at spaced points by spacers (not shown) which bear on top of the corresponding nipple 5 in the customary manner.

In carrying out the present invention, as illustrated in Figs. 1–3, the vapors prior to their passage through the bubble caps are conducted through the separator devices, each comprising a cylindrical or rectangular shell 8a, formed with a lower wall 16, the separating devices being held flush against the lower surface of the trays 2, as by bolts 10a. The lower wall 16 of the separator is of general conical shape forming a frustrum of a cone, and is secured at its outer edge to the lower edge of the cylindrical separator wall 8a. The upper end of the cone frustrum is formed with an outwardly extending flange. A central deflecting plate 18 is mounted above the admission passage 17 of the separator, and the outer periphery of this place is opposite to and spaced sufficiently from the outwardly extending flange of the cone frustrum to provide the circular vapor passage 19. The lower edge of the wall 8a is formed with one or more openings 14a, permitting the collected liquid to pass from the interior of the separator onto the next tray below.

The through bolt 10a is shown threaded at its upper end; and by tightening the nut carried by the bolt on the outer side of cap 6, this serves to draw the separator 8a upwardly until it is held flush against the lower surface of the tray. The separators as shown extend below the tray an over-all distance not substantially exceeding the vertical extent of the bubble caps above the tray.

The vapors passing upwardly through conical passage 17 lose some of the entrained liquid particles through contact with the walls of the bottom plate 16 and with the deflector plate 18. The form of the passage 19 is such that the vapors passing into the separator are first directed outwardly and downwardly and sharply reversed so as to afford a modified centrifugal action on the vapors. The abrupt change in direction of the vapor stream as it passes from the circular opening 19 causes the vapors to lose entrained particles of liquid, these particles being thrown against the outer wall of the separator, from whence they collect in the lower portion of the separator and ultimately flow from the openings 14a.

The form of the invention illustrated in Fig. 4 possesses certain additional advantages, in that the vapors are caused to flow downwardly and then the stream reversed so that the vapors move upwardly, the centrifugal action in this instance being particularly effective, in that the force of gravity assists the centrifugal force in removing any substantial liquid particles from the vapors.

In this form of the invention the thimbles 5b secured to the trays 2b may be extended downwardly, as indicated at 20, to support the separator body 8b, the cylindrical wall 20 serving as the deflector plate around which the vapors must pass in their passage to the bubble cap devices. The lower edge of the sleeve 20 is preferably flared to some extent, as shown, to afford a more effective contact and deflecting surface for the liquid particles.

Each separator body comprises an outer wall 8b and a bottom wall 9b, forming a cup-shaped body having an outlet or drain opening 14b to permit any liquid collected therein to escape. The upper edge of the wall 8b is formed with an inturned flange 22, positioned in opposed relation to the flanged portion 21 of the thimble wall 20. The separator body may be held in position by means of a cross-bar 24, secured to the lower end of an attachment bolt 10b for maintaining the separator body substantially in the position shown.

In the operation of this form of the apparatus rising vapors must pass over the upper edge of the wall 8b of a separator and then downwardly into the interior of the separator body. A certain proportion of the larger drops of liquid contact with one of the flanges 21 or 22, this liquid dripping into the chamber formed in the bottom of the separator and out through the opening 14b onto the next lower tray. The course of the vapors which pass into the interior of the separator is abruptly changed, and, due to the combined effect of gravity and of the centrifugal force afforded the vapors, they lose most of the entrained particles of liquid before passing through the vapor passage 4b and associated bubble cap.

The apparatus disclosed herein is found to be particularly effective in separating out the particles of liquid which are entrained in the vapor stream, prior to the passage of the vapors to a position above the corresponding partition or tray. The effectiveness of fractionation is very materially increased by the use of my invention because the liquid particles entrained in the vapor stream, being composed largely of hydrocarbons of higher boiling point than the vapors, are substantially removed. In the use of the ordinary fractionating tower of the prior art these liquid particles are entrained in the vapor stream and carried upwardly into higher parts of the tower, thus tending to decrease the sharpness of the fractionation effective in the column. This is particularly true in the rectification of complex mixtures of hydrocarbons, such as commonly met with in the petroleum refining industry, where commercial operation necessarily involves the passage of vapors through the rectifying equipment at very rapid rates.

Obviously many modifications and variations of the invention as hereinbefore set forth may be made without departing from the spirit and scope thereof, as set forth in the appended claims.

I claim:

1. In a fractionating apparatus, the combination of a fractionating chamber, a tray therein, a vapor passage extending through said tray and having a vapor inlet opening beneath said tray, a cylindrical contact member encircling the entrance to said inlet and means for directing the stream of vapor in a radial spray directly from the space without said contact member toward the inner surface thereof during the passage of said vapor toward said inlet.

2. In a fractionating tower provided with a transverse tray, vapor riser nipples on said tray, means for conducting vapors from beneath said tray to each of said nipples, said means comprising a vertically arranged outer shell communicating with each said nipple and formed with walls on the sides and bottom thereof and having a restricted passage for the escape of liquid from the lower portion of said shell and a vapor passage through the bottom wall of said shell communicating directly with the space beneath said tray and with the interior of said shell, and a baffle associated with said vapor passage to produce a radial flow of vapors in substantially all directions transversely of said shell toward the side wall thereof.

3. In a fractionating tower provided with a transverse tray, vapor riser nipples on said tray, means for conducting vapors from beneath said tray to each of said nipples, said means comprising a vertically arranged outer shell communicating with said nipple and formed with walls on the sides and bottom thereof, a central vapor inlet passage at the bottom of said shell, said shell including means for conducting liquid within said shell away from said inlet passage and for discharging the same into the space beneath said tray and a centrally arranged baffle cooperating with the bottom wall of the shell for deflecting upwardly rising vapors outwardly toward the side wall of said shell.

4. In a fractionating tower having a tray with a vapor riser thereon, and a bubble cap overlying said vapor riser; an entrainment separator associated with said vapor riser comprising a shell arranged beneath said tray and surrounding the lower end of said vapor riser, said shell extending below said tray an overall distance not substantially exceeding the vertical extent of said bubble cap above the tray, said shell having side and bottom walls formed with a drain opening to allow liquid to drip without accumulation through the open space beneath said tray and shell to a point of accumulation therebeneath, said shell being arranged to provide an annular vapor inlet from the open space beneath said tray into the space within said shell, said annular vapor inlet facing a wall of said shell in a manner to project the vapor directly toward the said wall, the lower end of said vapor riser being substantially spaced from the bottom wall of said shell.

5. In a fractionating tower having a tray with a vapor riser extending upwardly therefrom said riser having a lower vapor inlet opening substantially flush with said tray, and a bubble cap overlying said vapor riser; an entrainment separator associated with said vapor riser comprising a cylindrical shell having its upper end contacting the bottom wall of said tray and surrounding the vapor inlet of said vapor riser; said shell having a bottom wall formed with a vapor opening for the entrance of vapor from the space beneath said tray, and a baffle within said shell arranged above said vapor opening and cooperating with said bottom wall to form an annular passage facing the cylindrical wall of said shell in a manner to project vapor passing through said vapor opening and annular passage directly toward the cylindrical wall of said shell.

6. In a fractionating tower having a tray with a vapor riser extending upwardly therefrom and having a lower vapor inlet opening, and a bubble cap overlying said vapor riser; an entrainment separator associated with said vapor riser comprising a cylindrical shell having its upper end contacting the bottom wall of said tray and surrounding the vapor inlet of said vapor riser, said shell having an upwardly inclined bottom wall provided with a centrally arranged opening forming a frustum of a cone, the upper end of the cone frustum having an outwardly extending flange, and a baffle plate mounted within said shell above said opening, the outer periphery of said baffle plate being opposite and spaced from the said outwardliy extending flange to form an annular passage facing the cylindrical wall of said shell to project vapor passing through said opening and annular passage directly toward the cylindrical wall of said shell, the lower portion of said shell having a drain opening to prevent accumulation of liquid between the cylindrical and conical walls thereof.

7. In a fractionating tower having a tray with a vapor riser mounted therein and extending both above and below the tray, and a bubble cap overlying the said vapor riser; an entrainment separator associated with said vapor riser comprising a cylindrical shell surrounding the lower end of said vapor riser, the upper end of said cylindrical shell having an inturned downwardly inclined flange, and the lower end of said vapor riser being outwardly flared in spaced relation to said flange to provide an annular vapor passage opening downwardly into the space within said shell, the said shell being provided with a bottom wall closing the lower end thereof, and with a drain opening in the lower portion of the shell to prevent accumulation of liquid therein.

J. HAROLD PULS.